United States Patent

Troyer

[15] 3,670,593
[45] June 20, 1972

[54] SERIES TYPE VIBRATION DAMPER

[72] Inventor: William J. Troyer, Coldwater, Mich.
[73] Assignee: Simpson Industries Inc., Litchfield, Mich.
[22] Filed: July 13, 1970
[21] Appl. No.: 54,402

[52] U.S. Cl..............................................74/574, 188/1 B
[51] Int. Cl......................................................F16f 15/12
[58] Field of Search..................................74/574; 188/1 B

[56] References Cited

UNITED STATES PATENTS

| | | | |
|---|---|---|---|
| 2,585,382 | 2/1952 | Guernsey | 74/574 |
| 1,896,969 | 2/1933 | Paton | 74/574 |
| 1,896,962 | 2/1933 | Lee | 74/574 |
| 1,928,119 | 9/1933 | Vargha | 74/574 |

Primary Examiner—William F. O'Dea
Assistant Examiner—F. D. Shoemaker
Attorney—Beaman & Beaman

[57] ABSTRACT

A vibration damper for rotating members consisting of a hub member and at least two annular inertia members mounted upon the hub member by elastic elements. The hub and inertia members include cylindrical surfaces concentric to the axis of hub member rotation and the elastic elements cooperate with these surfaces for mounting one inertia member upon the hub member in a vibration absorbing relationship, and the second inertia member is mounted upon a cylindrical surface defined on the previously mentioned inertia member by an elastic element creating a "series" relationship between the inertia members and the hub member.

3 Claims, 4 Drawing Figures

PATENTED JUN 20 1972 3,670,593

INVENTOR
WILLIAM J. TROYER
BY Beaman & Beaman
ATTORNEYS

SERIES TYPE VIBRATION DAMPER

BACKGROUND OF THE INVENTION

The invention pertains to vibration dampers capable of absorbing and dissipating vibrations existing in rotary members such as crankshafts, drive shafts, propeller shafts and the like wherein an inertia member is mounted upon a hub element by vibratory movement and energy dissipating means, such as an elastomer.

Vibration damping means are commonly employed with rotating members, such as crankshafts for internal combustion engines, drive shafts, drive trains, and other rotary components. The purpose of such vibration damping means is to damp the torsional vibrations existing in a rotating shaft, and as existing in the crankshaft of internal combustion engines such torsional vibrations are most troublesome, and will create destructive forces unless controlled. The angular amplitudes of vibration vary throughout the engine operating speed range and significant amplitudes occur at engine speeds that represent certain multiples of the natural frequency of the mass elastic system. Torsional amplitudes with their related vibration cycles per revolution occur at various speeds depending upon the characteristics of the engine mass elastic system, or other rotating member. The mass elastic system of a conventional internal combustion engine which is not damped generally has only one mode of vibration which will be in a normal operating speed range. This is said to be the first mode of vibration and this mode is that excited by the harmonic torque variations of the engine and there will be only one node in the crankshaft which is the location at which the angular movement of the shaft is zero.

The amount of vibrational energy added to an internal combustion engine crankshaft is dependent upon the magnitude of the applied harmonic torque for a particular order of vibration and the phase angle at which this torque is applied. If the vibratory energy is large, the amplitude is large and this amplitude would be infinite at resonant speeds if it were not for the engine's capacity for dissipating the vibratory energy in the form of friction heat. Thus, the amplitudes will rise until the balance of energy addition equals the energy dissipation providing that the crankshaft does not break before this balance is attained. It can be said that vibration damping is any means of absorbing the vibratory energy generated within an engine. A vibration damper should be located at the point of maximum amplitude in the mass elastic system and with most internal combustion engine crankshafts this location is at the front end of the crankshaft.

Various types of vibration dampers have been employed to absorb crankshaft and rotating member vibrations, and the present invention is directed to the type of damper which employs a hub member which may be directly connected to the crankshaft and having an inertia member mounted thereon by means of elastic vibratory movement and energy dissipating means. In this type of vibration damper the elastic member or rubber acts as a torsional spring which connects the damper inertia member to the engine crankshaft. The inertia member and rubber or elastic element are so fabricated that the natural frequency of the assembly is a certain percentage of the natural frequency of the engine's mass elastic system. Tuning is accomplished by the proper selection of the physical dimensions of the elastic member, the proper shear modulus of the rubber compound and the proper amount of inertia in the inertia member. With a tuned rubber damper the relative angle of twist between the inertia member and the crankshaft may be three to four times the amplitude of the front of the crankshaft. This large relative motion makes possible the conversion of large amounts of vibratory energy into heat energy even though the amplitude of the front of the crankshaft is small.

While most conventional vibration dampers utilizing hub and inertia members employ a single elastic vibratory movement and energy dissipating member interposed therebetween they do not adequately control torsional vibrations throughout the engine speed range on some high specific output engines. Prior designs employing a plurality of inertia members interconnected by elastic elements or viscous fluids arranged in parallel are a matter of record. Reference is made to U.S. Pat. Nos. 2,594,555; 3,126,760; 3,207,000; and 3,285,096. With patents of this type wherein a plurality of inertia members or components are utilized, separate vibratory movement and energy dissipating members may be employed, one being employed with each inertia member, or the inertia members may be connected in "parallel" with respect to each other as in the case with U.S. Pat. No. 3,285,096. However, this type of multiple vibratory movement and energy dissipating arrangement, as used with a plurality of inertia members, is not completely effective in successfully controlling certain types of vibrations, such as those occurring at high internal combustion engine speeds, and the cost and complexity of this type of damper is excessive in view of the multiplicity of components involved, and in view of the complex manufacturing and assembly techniques required.

SUMMARY OF THE INVENTION

It is an object of the invention to provide a vibration damper for rotary members wherein the damper consists of a series arrangement of elastic vibratory movement and energy dissipating members and masses which are capable of producing superior vibration damping characteristics, and permits an increased conversion of large amounts of torsional vibratory energy into heat energy.

In the practice of the invention a hub member is employed which is attached to the rotating member in which the vibrations exist which are to be damped. The hub member includes a surface concentric with its rotational axis upon which is mounted an elastic vibratory movement and energy dissipation element, which inturn affixes an annular inertia member to the hub member. The clearance between the hub and inertia members is such that the elastic element is under a predetermined state of compression whereby a known tuned relationship exists between the damper components. Of course, the amount of inertia of the inertia member is known to introduce known factors into the vibration absorbing characteristics of the damper. The damper of the invention departs from the aforedescribed conventional configuration in that the inertia member has an annular concentric surface portion defined thereon which also cooperates with an elastic vibratory movement and energy dissipation element which in turn is employed to mount another inertia member to the assembly. The second inertia member is thereby affixed to the first inertia member by a compressed elastic element, and the first inertia member constitutes the sole mechanical support for the second inertia member. Thus, a "series" relationship between the two inertia members is produced.

A rotary vibration damper having a single elastic vibratory movement and energy dissipation element and a single inertia member will produce an arrangement wherein the inertia member can have two to four times the angular movement of the hub. In the arrangement of the invention the first inertia member can have two to four times the angular movement of the hub, and the second inertia member can have two to four times the angular movement of the first inertia member. Thus, since the friction work that can be done by a damper is a function of the friction index of the elastic member, such as rubber, the spring constant, and the square of the relative amplitude between the damper parts, it is possible to convert large amounts of torsional vibratory energy into heat energy with the construction of the invention. While the disclosed embodiment of the damper illustrates arrangements utilizing only two inertia members mounted upon a single hub, it would be possible to interconnect three, or more inertia members in a series relationship if the vibratory characteristics of such a damper were required.

As the manufacturing techniques, and the assembly procedures involved in the manufacture and assembly of vibration dampers in accord with the inventive concept are similar to those employed in the construction of more conventional single elastic element dampers, the invention can be economically practiced without requiring expensive or new assembly apparatus and techniques.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENTS

Figure 1:
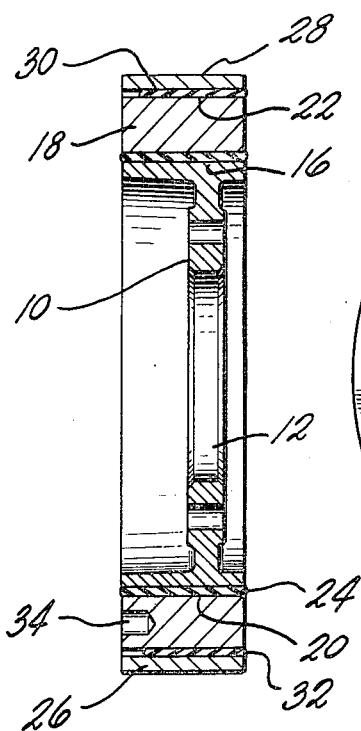
FIG. 1 is an elevational, sectional view of a vibration damper constructed in accord with the invention as taken along Section I—I of FIG. 2.
Figure 2:
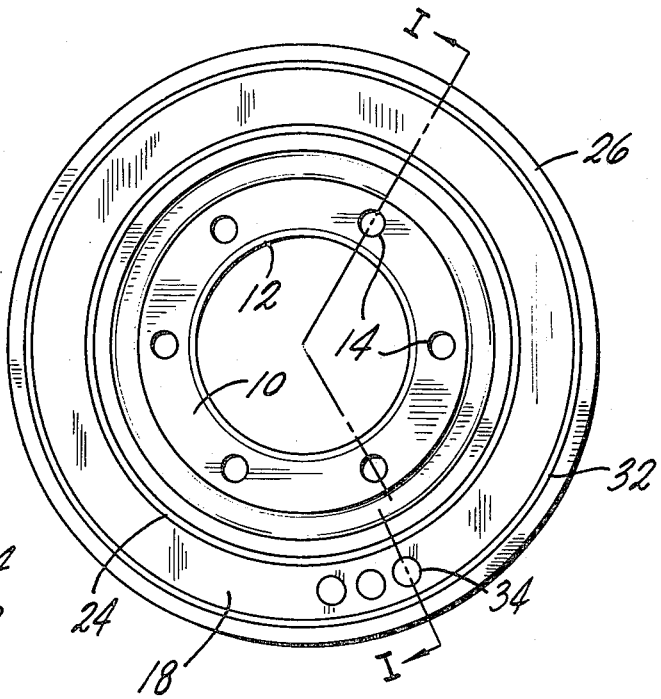
FIG. 2 is a side elevational view of the damper of FIG. 1.

Rotary vibration dampers of the general "tuned" type disclosed wherein an elastic vibratory movement and energy dissipation element is employed to assemble a hub and annular inertia member vary in form depending upon the particular application. The embodiment shown in FIG. 1 is a simplified embodiment which illustrates the basic concepts of the invention.

In the drawings, the hub member is represented at 10 and consists of a generally cylindrical element having a central opening 12 and a plurality of holes 14 defined in the web of the hub for receiving the mounting bolts whereby the hub may be firmly affixed to the front end of an internal combustion engine crankshaft, or other rotating element in which the vibrations to be damped occur. The hub includes an axially extending, outer, cylindrical, circumferential surface 16 as will be appreciated from FIG. 1.

The first or "inner" annular inertia member 18 is of a cylindrical configuration having an axial length corresponding to that of the hub member 10 and includes an inner cylindrical surface 20, of a diameter greater than that of the hub surface 16. Also, the inertia member includes an outer circumferential cylindrical surface 22.

An elastic vibratory movement and energy dissipation element 24 is interposed between the hub surface 16 and the inertia member surface 20, and this member may be formed of a rubber or similar material. Preferably, the elastic element 24 is inserted between the surfaces 16 and 20 under compression in that the radial dimension of the gap or clearance between the surfaces is less than the normal radial thickness of the element. Thus, as the element 24 is confined between the surfaces 16 and 20, its resilient tendency to expand produces a high frictional engagement with the engaged surfaces to form a firm assembly of the hub and inertia members. The aforedescribed relationships between these components is basically similar to that described in the assignee's U. S. Pat. No. 3,088,332.

The second inertia member 26 is also of an annular configuration including an outer cylindrical surface 28, and an inner cylindrical surface 30 of a diameter greater than the diameter 22 of the inertia member 18. As will be appreciated from FIG. 1, the inertia member 26 is assembled to the inertia member 18 by means of an elastic element 32 which has a normal radial thickness greater than the radial dimension of the spacing between the surfaces 22 and 30 whereby the element will be under compression and thereby maintain a firm assembly of the inertia member 26 upon the inertia member 18.

It will be noted that the axial length of the elastic element 32 is illustrated as being less than the axial dimension of the inertia member 26 and the hub member 10, and "tuning" can be achieved by varying the axial length of the elastic element, as well as the hardness and other characteristics of the element.

Holes 34 are illustrated as being formed in the inertia member 18 for balancing purposes.

From the aforedescribed instruction it will be appreciated that the inertia members 18 and 26 are mounted in "series" with each other in that the inertia member 18 constitutes the sole mechanical support for the inertia member 26 with respect to the hub member 10.

Where a conventional damper, which would consist of the hub member 10, the inertia member 18 and the elastic element 24 adds a second mode of vibration, a two-noded vibration, within the normal operation of an internal combustion engine, the disclosed embodiment utilizing an additional inertia member connected in series with the inertia member 18 adds a third, a three-noded, vibration within the normal operation of the engine. The inertia member 18 can have two to four times the angular movement of the damper hub 10, and the inertia element 26 can have two to four times the angular movement of the inertia member 18. As the friction work done by the damper is a function of the friction index of the rubber, the spring constant and the square of the relative amplitude between the damper parts, the arrangement of the invention permits considerably larger amounts of torsional vibratory energy to be dissipated than previously known constructions. It has been found that this type of series damper is particularly effective with high speed engines at the upper ranges of the engine velocity wherein vibrations beyond that capable of being effectively damped by conventional dampers may be controlled.

Figure 3:
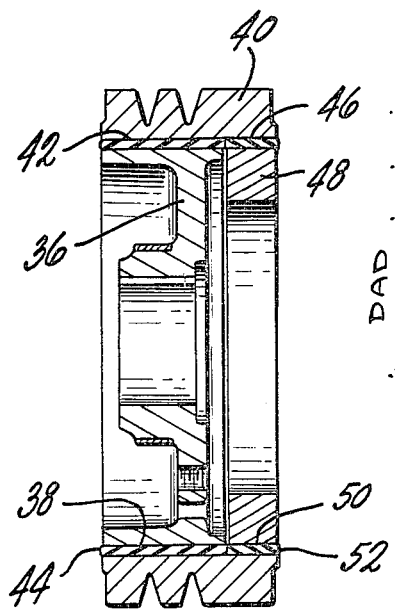
FIG. 3 is a view similar to FIG. 1 of another embodiment of vibration damper in accord with the invention.

In the embodiment of FIG. 3 the hub member is represented at 36, and is adapted to be mounted upon the rotating member in which the vibration exists, such as in a crankshaft, or the like. The hub 36 includes an outer circumferential, axially extending cylindrical surface 38. The first or "inner" inertia member 40 is of an annular configuration including an inner cylindrical surface portion 42 of a diameter greater than the hub surface 38 whereby the elastic vibratory movement and energy dissipating element 44 may be inserted therein in a compressed state, as previously described. In this manner the inertia member 40 is firmly mounted upon the hub member 36. As is often employed, V-belt grooves may be defined in the outer circumference of the inertia member.

The axial length of the inertia member 40 is greater than that of the axial length of the hub 36 whereby the surface 42, if extended, defines a cylindrical surface portion 46. A second annular inertia member 48 is in alignment with the surface portion 46 and includes an outer circumferential cylindrical surface 50 of a diameter less than the diameter of the inertia member surface 46 and an elastic element 52 is interposed therebetween as will be appreciated. Thus, in this manner the inertia member 48 is mounted upon the inertia member 40, in a series relationship, and the aforedescribed advantages of this type of relationship between a plurality of inertia members will be present.

In the embodiment of FIG. 3 the overall diameter of the vibration damper may be reduced as compared to the arrangement of FIG. 1, although the axial length may be increased. While the disclosed embodiments illustrate two inertia members interconnected in series on a common hub, it will be appreciated that three or more inertia members could be connected in series to add even further capacity to the damper, should the requirement exist. Both the inertia member 26 and the inertia member 48 include annular cylindrical surfaces to which an elastic element may be associated to cooperate with a third inertia member in a manner which will be apparent to one skilled in the art.

Figure 4:
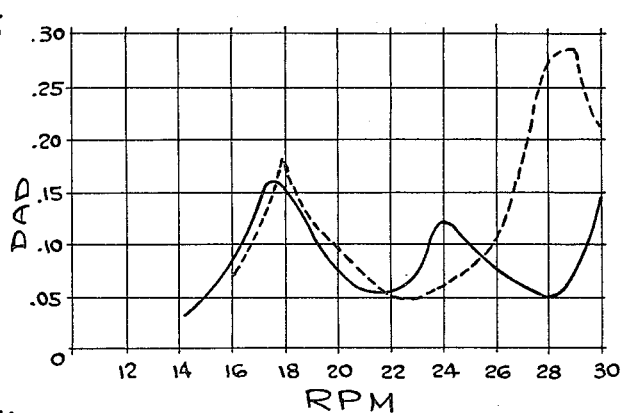
FIG. 4 is a graph indicating the improvement achieved by the utilization of a series type damper in accord with the invention as compared with a conventional damper with respect to the sixth order of vibration amplitudes.

The graph in FIG. 4 indicates a comparison of the vibratory damping characteristics of a damper constructed in accord with the invention, as compared with a damper utilizing a single inertia member. In the graph the vertical indicia indicates double amplitude in degrees, while the horizontal relationship indicates the speed of rotation of the member being damped and in this case, the crankshaft of a high specific output diesel truck engine in speeds of hundreds of RPMS. The dotted line represents the angular deflection in degrees of the damped hub of the conventional rubber vibration damper, and it will be appreciated that between 2,800 and 3,000 RPM the vibration becomes very high. The full line on the graph of FIG. 4 represents the vibration damping characteristics of a vibration damper constructed in accord with the invention and it will be appreciated that in the 2,800 to 3,000 range that the vibration has been significantly reduced. Both of the illustrated curves indicate sixth order vibration amplitudes related to the vibration cycles per revolution of the engine crankshaft.

It is appreciated that modifications to the inventive concept may be apparent to those skilled in the art without departing from the spirit and scope of the invention.

I claim

1. A torsional vibration damper for a rotary member comprising, in combination, a hub member adapted to be mounted upon the rotary member for concentric rotation therewith, said hub member including an axially extending first cylinder surface concentric to the axis of rotation of the rotary member, a first annular vibratory movement energy absorbing and dissipating elastic element mounted upon said hub member first surface, a first inertia member mounted upon said first energy absorbing and dissipating elastic element, said first inertia member having first and second axially extending cylindrical surface portions concentric to each other and concentric to said first cylindrical surface, said first elastic element being interposed between said first surface and said first surface portion supporting said first inertia member upon said hub member, a second annular vibratory movement energy absorbing and dissipating elastic element mounted on said first inertia member second cylindrical surface portion, a second inertia member mounted upon said second energy absorbing and dissipating elastic element, said second inertia member having a third axially extending cylindrical surface portion concentric to said second surface portion, and said second elastic element being interposed between said second and third surface portions supporting said second inertia member upon said first inertia member whereby said second inertia member is mounted upon said hub member in a series relationship through said first and second energy absorbing and dissipating elastic elements and said first inertia member.

2. A torsional vibration damper for a rotary member comprising, in combination, a hub member adapted to be mounted upon the rotary member for concentric rotation therewith, said hub member including an axially extending outer circumferential cylindrical surface concentric to the axis of rotation of the rotary member, a first vibratory movement energy absorbing and dissipating elastic element mounted upon said hub member, a first inertia member mounted upon said first energy absorbing and dissipating elastic element having an inner cylindrical surface portion and a second cylindrical surface portion concentric to said inner surface portion constituting an axial extension of said inner cylindrical portion, a second vibratory movement energy absorbing and dissipating elastic element mounted upon said first inertia member, a second inertia member mounted upon said second energy absorbing and dissipating elastic element having a second cylindrical surface, said first elastic element being interposed between said outer surface and said inner surface portion, and said second elastic element being interposed between said second surface portion and said second cylindrical surface whereby said second inertia member is radially disposed inwardly of said first inertia member and said second inertia member is mounted upon said hub member in a series relationship through said first and second energy absorbing and dissipating elastic elements and said first inertia member.

3. A torsional vibration damper for a rotary member comprising, in combination, a hub member adapted to be mounted upon the rotary member for concentric rotation therewith, said hub member including an axially extending outer circumferential cylindrical surface concentric to the axis of rotation of the rotary member, a first vibratory movement energy absorbing and dissipating elastic element mounted upon said hub member, a first inertia member mounted upon said first energy absorbing and dissipating elastic element, said first inertia member including an inner cylindrical surface portion and a second cylindrical surface portion concentric to said inner surface portion radially outwardly disposed of said inner surface portion constituting the outer circumference of said first inertia member, a second vibratory movement energy absorbing and dissipating elastic element mounted upon said first inertia member, a second inertia member mounted upon said second energy absorbing and dissipating elastic element, said second inertia member including a second cylindrical surface constituting an inner surface of said second inertia member, said first elastic element being interposed between said outer surface and said inner surface portion, and said second elastic element being interposed between said second surface face portion and said second cylindrical surface whereby said second inertia member is mounted upon said hub member in a series relationship through said first and second energy absorbing and dissipating elastic elements and said first inertia member.

* * * * *